UNITED STATES PATENT OFFICE.

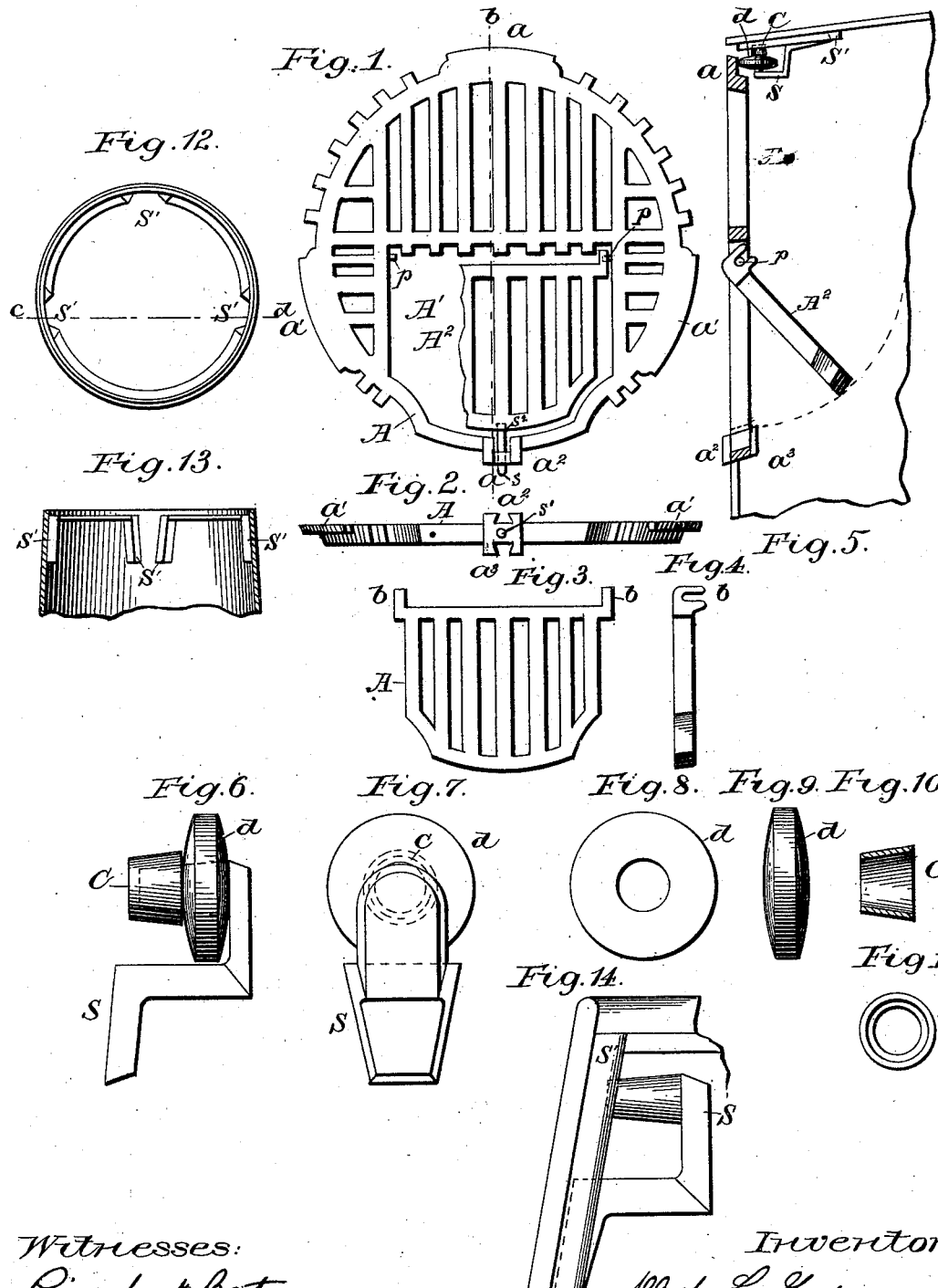

ALBERT L. GOODENOW, OF UTICA, NEW YORK.

GRATE.

SPECIFICATION forming part of Letters Patent No. 351,507, dated October 26, 1886.

Application filed April 25, 1884. Serial No. 129,224. (No model.)

*To all whom it may concern:*

Be it known that I, ALBERT L. GOODENOW, of the city of Utica, county of Oneida, and State of New York, a citizen of the United States, have invented a new and useful Improvement in Grates; and I do hereby declare the following to be a full, clear, and exact description of the same, reference being had to the accompanying drawings, and to the letters and figures marked thereon.

My invention relates to an improved grate and dumping device, hereinafter more particularly described.

In the accompanying drawings, Figure 1 is a top view of a portion of the grate. Fig. 2 represents a front view of same. Fig. 3 represents a plan of the trap or dumping device. Fig. 4 represents a side view of same. Fig. 5 represents a side view of the dumping-trap and a section of the grate and fire-pot. Fig. 6 represents a side view of the roller and support; Fig. 7, a front view of same. Fig. 8 represents a side view of the roller. Fig. 9 represents an end view of the same. Fig. 10 represents a sectional view of a collar, to accommodate the expansion or contraction of the roller when in use. Fig. 11 represents an end view of the same. Fig. 12 represents a top view of the circular grate-support, into which the roller-supports fit. Fig. 13 represents a side view of the same at lines $c\ d$, Fig. 12, showing the dovetailed flange for the reception of the collar-support. Fig. 14 represents a side view of same with roller-supports in place in the flanges attached to a section of the ash-pit base.

Having described my invention by reference to the figures marked on the accompanying drawings, I will now proceed to describe it by reference to the letters marked thereon, in which similar letters refer to corresponding parts throughout the several views.

A represents a grate.

$a$ represents a projecting flange on the back surfaces, and $a'\ a'$ projecting flanges on the periphery of the grate. These are provided to support the grate on the rollers, hereinafter described.

$a^2\ a^3$ represent projecting surfaces, suitably formed to insert a shaker-rod.

A' represents a section of the dumping-trap cut away.

A² represents the dumping-trap, the rear portion of which is provided with slotted lugs $b\ b$, which fit over pin P P in the grate, forming a hinge, at the same time allowing the dumping-trap to be easily removed. The dumping-trap is held in a horizontal position by a pin, $s$, which passes through the aperture $s'$ in the outer circle of the grate and engages with aperture $s^2$ in the dumping-trap. The trap is dumped by withdrawing the pin, which permits the trap to fall or swing downward.

The grate containing the dumping device is supported on three or more rollers, so located as to work on the under surface of the flanges, before described.

$d$ represents the anti-friction rollers pivoted to angle-iron S, Fig. 6. On the end of the pivot which carries anti-friction rollers $d$ collar C is fitted loosely over the pivot, to allow for expansion and to keep the wheels in place under the grate. This collar is held on the pivot loosely by the proximity of the end of the pivot to the walls of the ash-pit when the angle-arm is in place for receiving the grate. The angle-iron wheel and collar are fitted into flanged dovetailed lugs formed in the ash-pit, as shown in Figs. 12, 13, and 14, to enable the wheels to be inserted, retained, and removed without bolts or nuts.

A circular grate is shown in the drawings; but other forms may be used.

What I claim, and desire to secure by Letters Patent, is—

1. The combination, with the ash-pit base having dovetailed flanges on its inner walls, of the supporting-brackets fitted therein and the anti-friction rollers mounted on the brackets, and a grate mounted on said roller, substantially as and for the purpose set forth.

2. The combination, with the ash-pit having dovetailed flanges on its inner walls, of the supporting-brackets fitted thereto, anti-friction rollers mounted thereon to be rotated, and the collar on the bracket between the roll and the wall of the ash-pit for keeping the anti-friction rolls in place, and the grate mounted on said rolls, substantially as and for the purpose set forth.

Dated and signed at Utica, New York, this 23d day of April, 1884.

ALBERT L. GOODENOW.

Witnesses:
PIERREPONT BARTOW,
H. M. LOVE.